May 19, 1931.  W. C. S. GRAHAM  1,806,249
PULVERIZING OR DISINTEGRATING EQUIPMENT
Filed Feb. 23, 1929  5 Sheets-Sheet 1

INVENTOR.
Warren C. S. Graham,
BY John C. Brady
ATTORNEY.

May 19, 1931.   W. C. S. GRAHAM   1,806,249
PULVERIZING OR DISINTEGRATING EQUIPMENT
Filed Feb. 23, 1929   5 Sheets-Sheet 2

INVENTOR.
Warren C. S. Graham,
BY John B. Brady
ATTORNEY

May 19, 1931.  W. C. S. GRAHAM  1,806,249
PULVERIZING OR DISINTEGRATING EQUIPMENT
Filed Feb. 23, 1929   5 Sheets-Sheet 3

INVENTOR.
Warren C. S. Graham,
BY
John B. Brady
ATTORNEY

May 19, 1931.  W. C. S. GRAHAM  1,806,249
PULVERIZING OR DISINTEGRATING EQUIPMENT
Filed Feb. 23, 1929   5 Sheets-Sheet 4
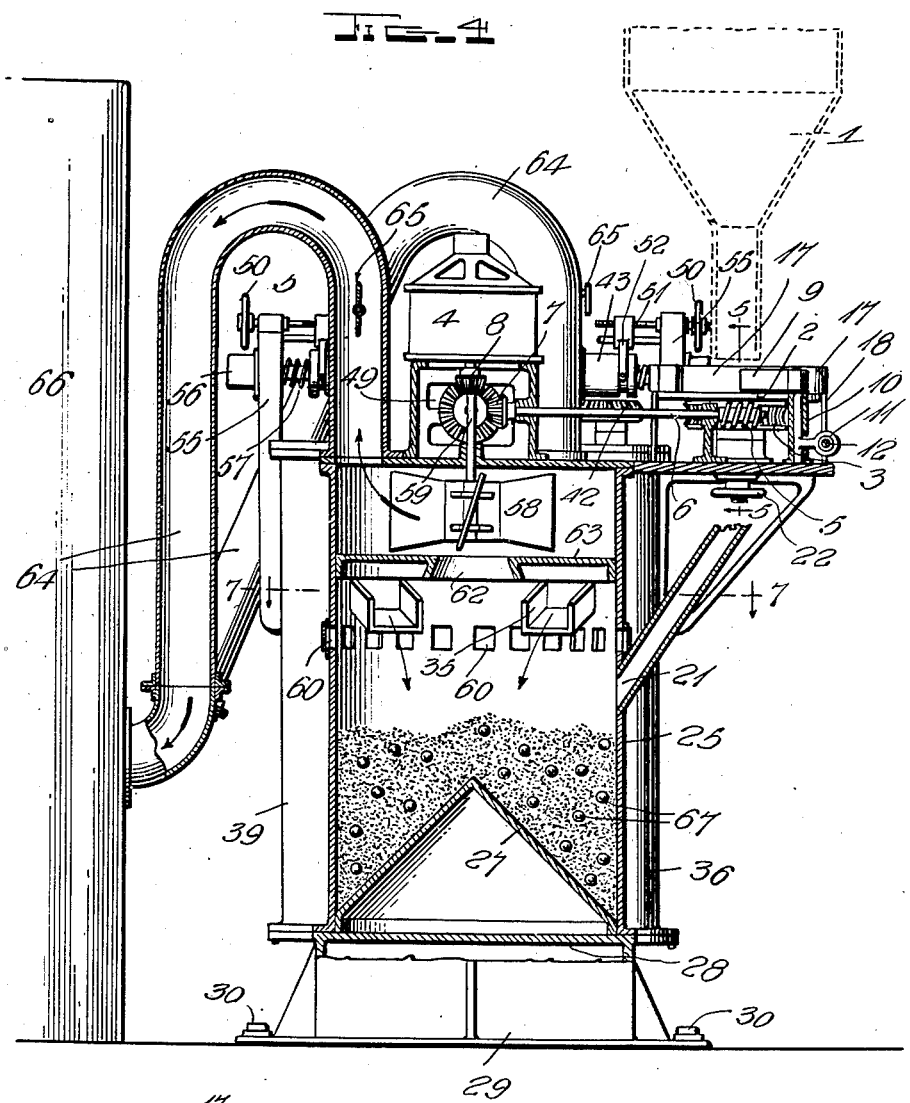
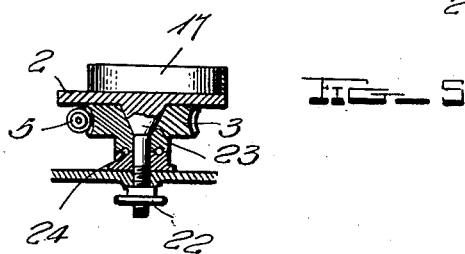
INVENTOR.
Warren C. S. Graham,
BY John O. Brady
ATTORNEY

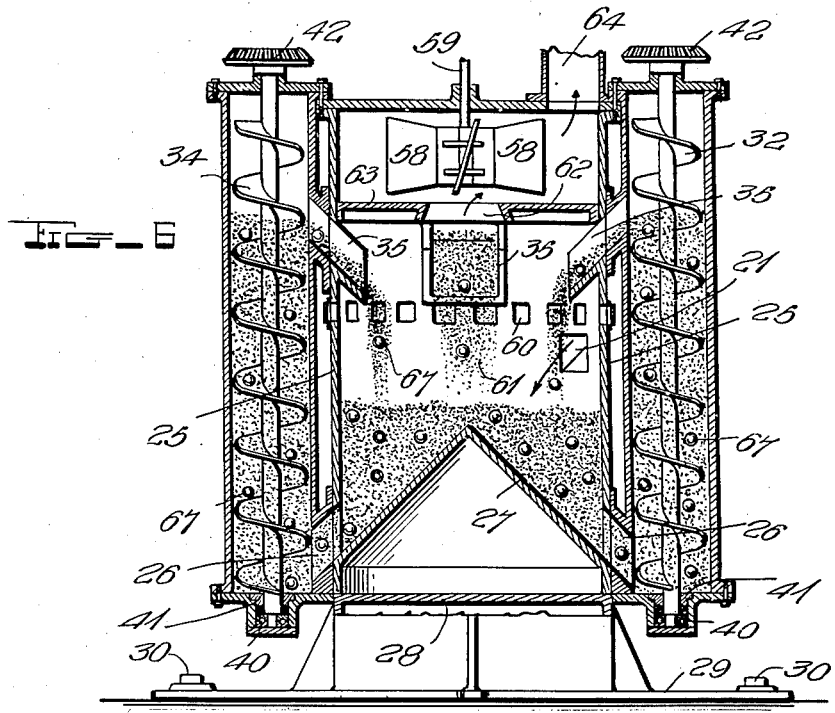
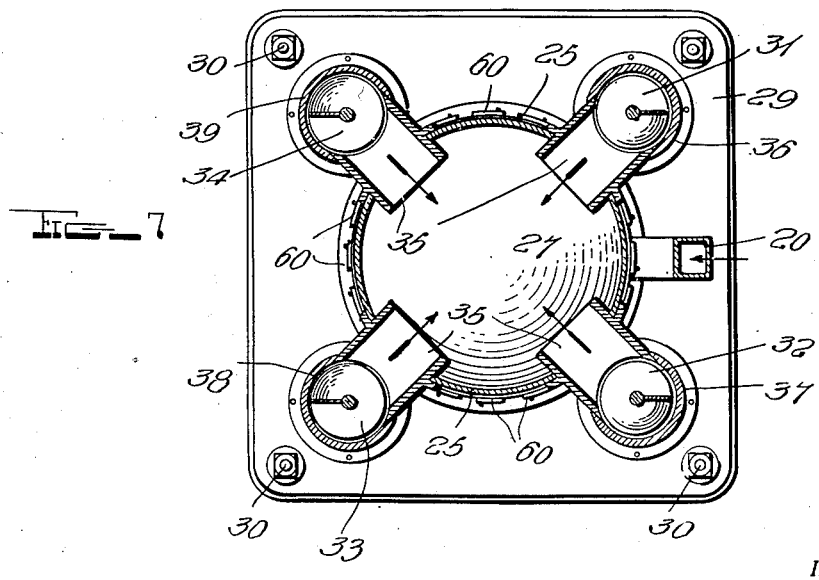

Patented May 19, 1931

1,806,249

UNITED STATES PATENT OFFICE

WARREN C. S. GRAHAM, OF NEW ORLEANS, LOUISIANA

PULVERIZING OR DISINTEGRATING EQUIPMENT

Application filed February 23, 1929. Serial No. 342,167.

My invention relates to an apparatus for the reduction of materials, principally coal, lignite, peat, coke and similar materials, or fuels, to an extremely fine or powdered form and the feeding of this powdered or pulverized fuel into a furnace, or furnaces, or other places, where it may be burned. Other materials, as well, such as rock, bone, ore, phosphate, clay, chalk, limestone, talc, paint material, etc. may be pulverized or disintegrated also by means of the machine involving my invention.

My invention resides in a fundamentally new principle in which the material pulverized or disintegrated and the grinding media, which may consist of steel or hard balls or other material, are circulated through a large cylinder or other receptacle producing an extremely fine finished pulverized or powdered material or fuel which can be blown either directly or indirectly into a furnace, or any number of furnaces, or other places, where it may be burned.

An object of my invention is to provide a method whereby extremely fine powdered or pulverized material, or fuel, can be produced in a cylinder or other receptacle by the circulation of the material and a grinding media and the taking out of this fine finished product, or powdered or pulverized fuel, from the cylinder or other receptacle by means of a fan placed on top of the cylinder or other receptacle, called a mill, and the deliverance by this same fan of the powdered or pulverized fuel into one pipe or any number of pipes for distribution into a furnace, or furnaces, or to other points.

It is possible to construct my mill so that it will be extremely light in weight without sacrificing any of its efficiency. This feature, combined with the fact that it is possible to have equal distribution of the finished powdered or pulverized material or fuel out of any number of pipes placed on top of the vertical fan on top of the cylinder or receptacle, makes this machine involving my invention particularly adaptable to Scotch marine boilers commonly employed aboard steamships for the generation of steam. The placing of the fan in this described manner eliminates the necessity of having a distributor and thereby increases the reliability of my unit.

Another object of my invention is to produce a machine of great simplicity whereby it is possible to drive all moving features or parts requiring power and regulation on my mill by means of one common driving unit be it steam, electrical or other drive, making the machine involving my invention more reliable than any other by the elimination of the possibility of breakdown of a multiplicity of drives. As each moving part of my machine requiring power operates in direct relation to each other, the slowing down or speeding up of the driving unit automatically descreases or increases the material fed into the mill, decreases or increases the circulation of the grinding media, and decreases or increases the finished product taken out of the mill. This likewise decreases or increases the power consumption in direct proportion, whereas with all other mills the power consumption is not reduced but by an extremely small amount when the capacity of output of the mill is reduced.

My invention will be clearly understood from the following specification, reference being had to the accompanying drawings which illustrate forms that my invention may take, and in which:

Fig. 4 is a vertical cross-sectional view taken longitudinally through the machine involving my invention on line 4—4 of Fig. 1;

Figure 1:
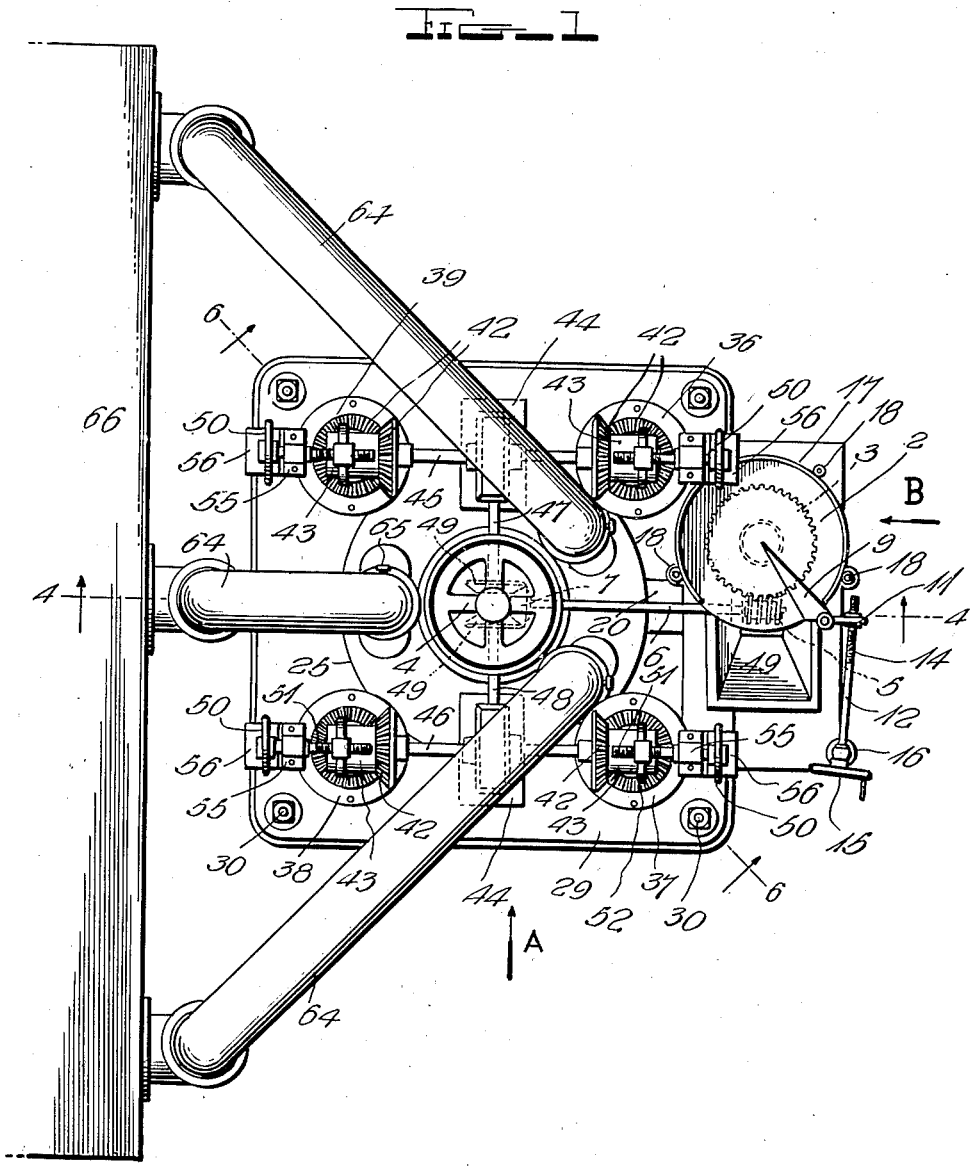
Figure 1 is a plan view showing the top of my machine.
Figure 2:
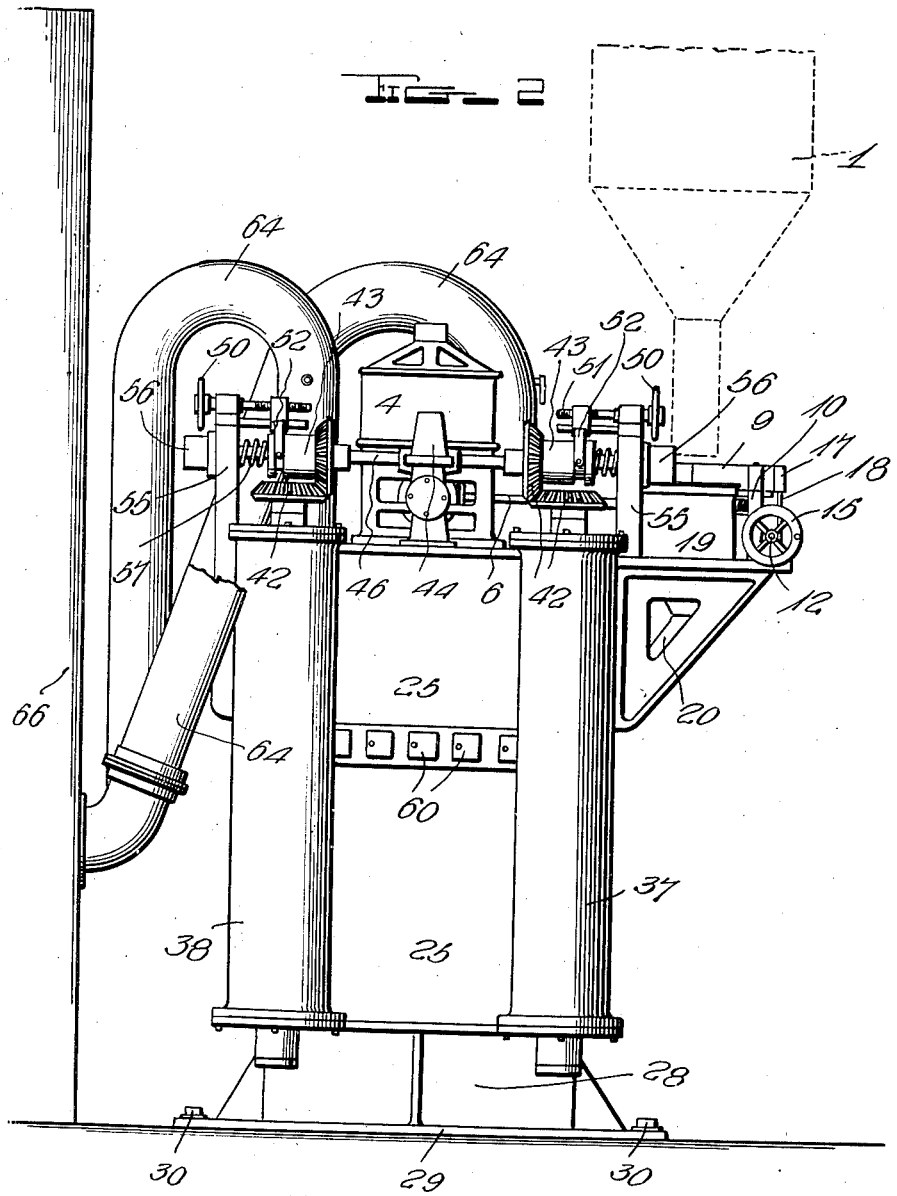
Figure 2 is a side elevation of the equipment looking in the direction of arrow A and illustrating the raw material inlet, one of the pulverized coal outlet pipes being broken away to show the parts more accurately.
Figure 3:
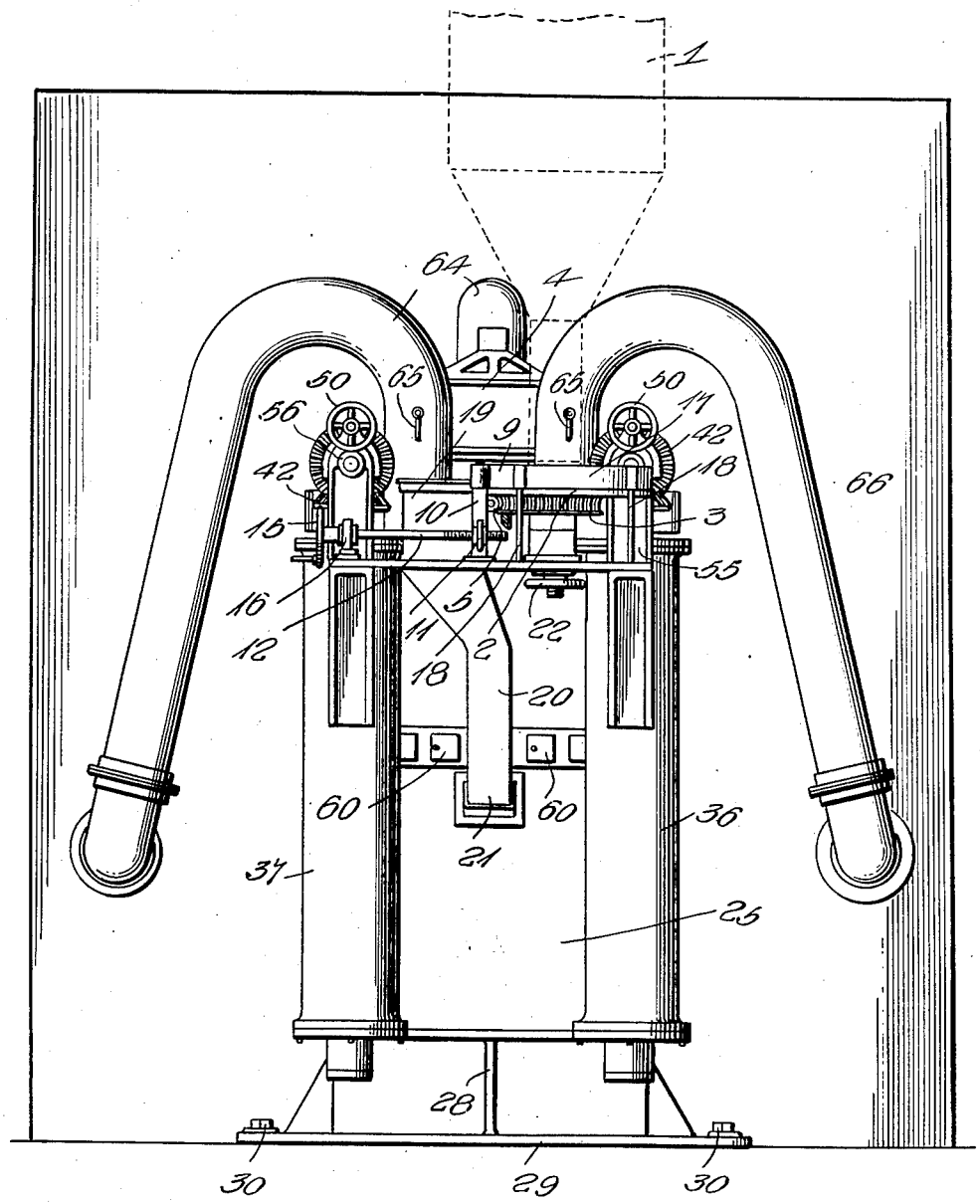
Figure 3 is a side elevation of the complete machine involving my invention looking in the direction of arrow B of Fig. 1.

Fig. 5 is a detailed cross-sectional view taken through the feeder table showing the clutch mechanism for controlling the operation of the feeder table;

Fig. 6 is a diagonal longitudinal cross-sectional view taken through the pulverizer on line 6—6 of Figure 1; and Fig. 7 is a lateral cross-sectional view taken on line 7—7 of Fig. 4.

Referring to the type of machine shown in the drawings, the raw material to be pulverized or disintegrated may be fed from a hopper 1, or any other source onto a disc, table or any other type of feeder 2, and fed into the mill automatically. The rate of flow from the feeder into the mill in the type of feeder shown can be governed by means of varying the speed of the table or disc by means of the gear 3, connected to the central driving unit 4, by means of the worm 5, the shaft 6, the gear 7, and the main pinion 8, which is directly connected to the driving unit shaft. The rate of flow from the feeder into the mill may also be controlled by the position of knife 9, which may be made to cut off varying quantities of the raw material as the disc 2 revolves by moving the knife, or arm, into different positions atop the disc or table 2. This movement of the knife 9 or arm is accomplished in the type of feeder shown in the drawings by means of the pivotal mounting of the knife or arm on a bearing 10, and regulating the angle at which the knife is placed by means of the bracket 11, through which a shaft 12 having a screw threaded portion 14 is revolved by means of a hand wheel 15 braced by a bearing 16. In order that the raw material will not fall from the disc or table, a band 17, held by arms 18 or otherwise can be placed around the outside edge of the table or disc 2.

The raw material so proportioned off falls into the receiving hopper 19 and passes into the mill through the chute 20, entering the mill at 21. The disc or table feeder 2 can be disconnected from the driving unit by disengaging it from the gear 3 by means of the handle 22 which releases the moving gear from the disc or table feeder by loosening the friction clutch 23 and permitting the gear 3 to idle on the roller bearings 24.

The mill shown in the drawings is a cylinder but this may assume any other shape, its purpose being to serve as a receptacle for the material to be pulverized or disintegrated; the grinding media, or elements, to provide a space where these two, the material and the grinding media, can be circulated, and a space, or section, through which air, preferably preheated, or at atmospheric temperature or otherwise, can be passed, sucked, drawn, or blown, at a low velocity to pick up the extremely fine powdered, pulverized or disintegrated finished material and passed onto an outside source.

The number and size of bottom outlets 26 in the bottom of the cylinder or receptacle 25 may be varied. To facilitate the flowing of the raw material and the grinding elements to the outlet, or outlets 26, a cone-shaped bottom plate 27 may be placed in the cylinder or receptacle 25. The cylinder 25 and bottom plate 27 is supported on a foundation bed 28 permanently secured to the supporting surface at 29 by suitable bolt members 30.

In the drawings, the material to be pulverized or disintegrated and the grinding media are shown as being elevated by means of a multiplicity of screw conveyors 31, 32, 33 and 34. Any other means, however, may be employed to elevate, or circulate, the material to be pulverized or disintegrated, and the grinding media, or elements.

When employing the screw conveyors 31, 32, 33 and 34, as shown in the drawings, the material and grinding media, such as metallic balls 67, are carried up from the bottom outlet, or outlets 26 to the top outlet, or outlets 35, which discharge into the top of the cylinder or receptacle 25. By this means the material to be pulverized or disintegrated and the grinding media, or elements, are circulated in or through the cylinder or receptacle 25. The balls 67 are of substantial weight and in dropping upon the material tend to break the material and pulverize the material. The balls 67 are introduced into the furnace by simply dropping them into the hopper 19 simultaneously with the raw material to be ground. Hence the fineness of the product is largely governed by the number of balls employed.

The screw conveyors are enclosed in dust-tight cases 36, 37, 38 and 39. Ball thrust bearings 40 are employed to reduce friction and are held in place and made dust-proof by means of a thrust collar 41. The screw conveyors, or other elevating means, may be direct connected to the main driving unit 4 by means of coacting bevel gears 42, a coupling 43, a reduction gear transformer 44, shafting 45 or 46, 47 or 48, and the gears 49 on the main shaft of the main driving unit 4.

The purpose of the coupling or couplings 43 is to disengage each conveyor or screw separately while the machine is in operation so as not to be compelled to shut down the entire machine when it is desired to renew or repair one of the conveyors. This is accomplished by means of a handle 50, operating a screw shaft 51, throwing the coupling in or out of gear through the lever 52 by means of clutch inside of the coupling 43. The standards 55 support the shafts 45 and 46 from the reduction transformer 44 through bearings 56, and also holds the screw shaft 51 and handle 50. A spring 57 holds the required tension on the coupling 43.

When it is desired to renew or repair one of the screws, such as 31, the handle 50 can be revolved to disengage the coupling 43, thereby stopping or disconnecting the screw 31. Gates, not shown in the drawings, but located at the outlets 26 and inlets 35, can be closed to shut off the material and grinding elements. The screw 31 enclosed in the shell 36 can be then removed, repaired or renewed, and again placed in service without stopping the entire machine.

In order to draw off the finished product, a fan 58 is placed on top of the cylinder or receptacle 25 and direct connected to the main driving unit 4 through the main shaft 59. Air inlets 60 are placed in the side of the cylinder or receptacle 25 to permit the entrance of air, preferably preheated. These air inlets 60 may be placed at any point or place in the cylinder or receptacle to permit the maximum sweep of the air through the receptacle or cylinder. Shutters may be placed over these air inlets to regulate the flow of air into the mill. Suction from the fan 58 draws air from the inlets 60 through the cylinder or receptacle, picking up the finished pulverized or disintegrated product shown at 61 as well as the moisture therein. The velocity of the air through the cylinder or receptacle 25 governs the fineness of the finished product. If the air is preheated this will materially aid in drying any moisture which may be either in the material or enter the mill. Having no close clearances the machine involving my invention is able to handle successfully materials having extremely high moisture content, particularly with preheated air. This is particularly advantageous when using lignite or peat. The space between the top of the cylinder or receptacle 25 and the fan 58 may be left open or it may be closed and an aperture 62 in partition plate 63 provided of a size depending upon the capacity of the mill and the fineness of the finished product installed.

Oxygen in the air passed through the cylinder or receptacle 25 at a low velocity tends to combine with the carbon in the fuel when fuel such as coal, lignite or peat is used, thus aiding more rapid combustion when mixed with an outside source of air or oxygen necessary for complete combustion.

While the fan shown in the drawings is placed on top of the mill or cylinder and this fan draws the air through the mill or cylinder by suction, it is also possible to pass the air through the mill or cylinder by blowing it through from an outside source. That is, a slight draft from an outside source can be sent through the mill or cylinder at the same velocity as that created by the suction force of the fan located as shown in the drawings. This forced draft picks up only the finished product and blows it out of the mill. The pressure or velocity of the air through the mill will govern the fineness of the finished product. This forced draft can be put into the mill or cylinder through the air inlets 60, or any other convenient point and forced out carrying the finished powdered, pulverized or disintegrated material at an opposite point, preferably the top of the mill, through aperture 62, or at any other point, preferably at a point permitting the largest or greatest air sweep of the mill.

The fan 58 being on the top of the mill, as shown in the drawings, in a vertical position with the blades slightly bent does not permit of stratification of the pulverized or disintegrated material, such as occurs with a horizontal fan, and one or any number of pipes or leads 64 with valves 65 may be taken off of the top of the fan and the finished product fed with equal quantities through the same size and length of pipes to any number of furnaces or places such as represented at 66. This eliminates the need for a distributor when the machine of my invention is employed for firing a boiler having a multiplicity of furnaces such as a Scotch marine type of boiler having more than two furnaces.

It is also possible to place the fan at any point away from the mill and in any position connecting the suction of the mill to the mill by means of piping or tubing through the aperture 62.

It is possible to utilize one main driving unit with the machine involving my invention to drive all parts requiring mechanical power. This driving unit may be from any source of power, steam, electricity or any other direct, or indirect, connected, or outside source. This is a decided advantage over other mills requiring more than one driving unit. The connection between the driving unit and the parts driven may be as shown in the drawings or by any other method or means. As each driven part of the machine involving my invention is a direct function of the other, all driven parts may be speeded up or slowed down together in direct relation to the other by means of a common driver. That is, the slowing down of the common driver, when connected to each and all of the parts requiring power, automatically slows down the disc or table feeder feeding the raw material into the pulverizer or mill, slows down the elevating or circulating mechanism, slows down the fan or distributor, all and each in direct proportion, and thereby automatically reduces the input and the output of the machine involving my invention without any manual or outside assistance. This reduction in speed of the common driver reduces the power consumption of the driving mechanism in direct proportion to the machine capacity, thus effecting an economy in power consumed as the input and output of the machine involving my invention are both reduced, each in direct proportion of the other. This is not possible with any other pulverizing or disintegrating apparatus. With other apparatus when the input and output is decreased the power consumption of the machine does not reduce itself in direct proportion but only reduces itself a small amount.

While one common driving mechanism may be used in the machine involving my invention, it is likewise possible to use separate drives on each part requiring power. The use of separate driving units on my machine in no way affects the machine's operation.

Variations may be resorted to within the scope of my invention and portions of the apparatus of my invention may be used without others, and I intend no limitations upon my invention except as may be imposed by the scope of the appended claims.

What I claim as new and desire to secure by Letters Patent of the United States is as follows:

1. In a pulverizing apparatus, a receptacle having a downwardly inclined base, means for depositing material in bulk in said receptacle, means for subjecting said material in bulk to successive bombardment by the gravitational effects of a multiplicity of weights directed upon the material from diametrically opposite directions for reducing the material from bulk to a substantially powdered state and gravitating the reduced material down said inclined base, and means for continuously withdrawing the powdered material by flotation from the remaining bulk.

2. In a pulverizing apparatus, a receptacle having a downwardly inclined base, means for delivering predetermined quantities of material in bulk to said receptacle, means for continuously dropping weights upon the bulk material within said receptacle from predetermined diametrically opposite positions in said receptacle for reducing said material to a substantially pulverized state and gravitating said material down said base, and suction means for withdrawing the pulverized material from the bulk.

3. In a pulverizer, a receptacle having a downwardly inclined base, means for feeding predetermined quantities of material in bulk to said receptacle, a multiplicity of means located in diametrically opposite positions in said receptacle for subjecting said material in bulk to bombardment by the gravitational effects of a multiplicity of weights for reducing said material from a bulk condition to a substantially pulverized state and gravitating said material down said base, and forced draft means for withdrawing the pulverized material from the remaining bulk.

4. In a pulverizer, a receptacle having a downwardly directed base, means for delivering a predetermined quantity of material in bulk to said receptacle, a multiplicity of conveyors positioned on diametrically opposite sides of said receptacle, a plurality of weights moved by said conveyors for successively bombarding said material in bulk for reducing said material to a substantially pulverized state and gravitating said material down said base, and suction means for removing the pulverized material from the remaining bulk.

5. In a pulverizer, a receptacle for receiving material in bulk, said receptacle having an inclined base, a multiplicity of conveyors disposed adjacent said receptacle, a plurality of weights arranged to be moved by said conveyors and successively gravitated from positions adjacent a higher level of each of said conveyors for bombarding said bulk material from diametrically opposite positions of said receptacle, to a position determined by the inclination of the base of said receptacle adjacent a lower level of said conveyors for reducing said bulk material to a pulverized state, and suction means for withdrawing the pulverized material.

6. In a pulverizer, a receptacle for receiving material in bulk, an inclined base for said receptacle, a multiplicity of screw conveyors disposed adjacent said receptacle and operating in channels connected by ports in said receptacle adjacent the base and at points adjacent the top of the receptacle, a multiplicity of weights arranged to be moved by said conveyors from a position adjacent the base of said receptacle and discharged through the portions adjacent the top of the receptacle at diametrically opposite positions therein for successively bombarding material in bulk under gravitational effects, said weights being collected by the lower extremities of said conveyors for a continuous feeding process, and means for withdrawing the pulverized material.

7. In a pulverizer, a receptacle for receiving material in bulk, said receptacle having an inclined base at the lower extremity thereof, a conveyor receiving material discharged by the lower extremity of said inclined plane and delivering material adjacent the upper portion of said receptacle, a multiplicity of weights arranged to be carried by said conveyor for delivery with said material at a point adjacent the upper portion of said receptacle for the bombardment of said material in bulk by the successive gravitational effects of said weights for reducing said material to a pulverized state, and forced draft means in said receptacle for withdrawing the pulverized material.

8. In a pulverizer, a receptacle having an inclined base, a multiplicity of conveyors receiving material adjacent the base of the receptacle and returning material to the receptacle adjacent the upper portion thereof, a multiplicity of weights arranged to be carried by said conveyors and successively dropped from diametrically opposite positions adjacent the upper portion of said receptacle for bombarding said material in bulk and reducing the material to a substantially pulverized state, and suction means for withdrawing the pulverized material.

9. In a pulverizer, a receptacle for receiving material in bulk said receptacle having an inclined base, a multiplicity of conveyors arranged adjacent said receptacle for receiving material adjacent the lower extremity of the inclined base and returning the material to a position adjacent the top of the receptacle, a multiplicity of weights guided by said conveyors and dropped from diametrically opposite positions adjacent the upper portion of said receptacle upon said material in bulk for reducing said material to a pulverized state, said weights gravitating to the lower portions of said conveyors for a continuous feeding and delivery process, and means for withdrawing the pulverized material.

10. In a pulverizer, a receptacle, means for continuously delivering material in bulk to said receptacle, a plurality of conveyors for receiving material at the base of said receptacle and returning the material to a position adjacent the upper portion thereof, a multiplicity of weights guided by each of said conveyors in a continuous cycle, said weights being dropped from diametrically opposite positions adjacent the upper portion of said receptacle upon said material in bulk for reducing said material to a pulverized state, and suction means for withdrawing the pulverized material.

11. In a pulverizer, a receptacle, rotary driving means located at the top of said receptacle, means driven by said rotary driving means for continuously feeding material in bulk to said receptacle, a multiplicity of conveyors located adjacent said receptacle and connected at their lower extremities with said receptacle and at their upper extremities with the upper portion of said receptacle for receiving material at the lower portion of the receptacle and returning the material to the upper portion thereof, a multiplicity of weights guided by said conveyors in a continuous cycle for successively bombarding the material in bulk in said receptacle from diametrically opposite positions therein for reducing the material to a pulverized state, said conveyors being simultaneously driven from said rotary driving means, and forced draft means in said receptacle controlled by said rotary means for withdrawing the pulverized material.

12. A pulverizer comprising a receptacle, rotary means positioned adjacent said receptacle, means controllable by said rotary means for continuously feeding material in bulk to said receptacle, a multiplicity of rotary screw conveyors disposed adjacent said receptacle in positions on diametrically opposite sides of said receptacle for receiving material adjacent the base of said receptacle and returning material to a position adjacent the upper portion of said receptacle, means for simultaneously driving said rotary screw conveyors from said rotary means, a multiplicity of weights guided by said rotary screw conveyors for successively bombarding material in bulk in said receptacle in a continuous cycle for reducing said material to a pulverized state, and suction means operated by said rotary means for withdrawing the powdered material.

13. In a pulverizer, a receptacle, rotary means disposed adjacent said receptacle for controlling the feeding of bulk material to said receptacle, a plurality of rotary screw conveyors, each receiving material adjacent the base of said receptacle and returning material to the upper portion thereof, a multiplicity of weights guided by said rotary screw conveyors for successively bombarding said material in bulk in continuous cycles from opposite positions adjacent the walls of said receptacle, and reducing said material to a pulverized state, and means for establishing a forced draft of oxygen through said receptacle and withdrawing the pulverized material.

14. In a pulverizer, a receptacle having a downwardly directed base, means for feeding material in bulk to said receptacle, means for cyclically bombarding said material in said receptacle from a plurality of positions around the walls thereof for reducing the material to a pulverized state and gravitating said material down said base, means for admitting air to said receptacle and separate means for intermingling the air with the pulverized material and withdrawing said material from said receptacle.

15. The method of preparing a mixture of air intermixed with finely divided material which consists in delivering bulk material in a concentrated mass over a downwardly directed inclined base and successively and cyclically, bombarding said material in bulk from a plurality of predetermined positions above the bulk material for pulverizing the same and gravitating the material downwardly over the base, subjecting the pulverized material to the agitating influence of air and withdrawing the air intermingled with the pulverized material.

16. In an apparatus for pulverizing material in bulk, a receptacle for receiving bulk material, a conical shaped base concentrically disposed within said receptacle with the apex of said base directed upwardly within said receptacle, a multiplicity of rotary screw conveyors disposed adjacent said receptacle on the interior thereof for receiving the material at the lower limit of said conical shaped base and returning the material to the upper portion of said receptacle, a multiplicity of weights guided by said conveyors for cyclically bombarding said bulk material for reducing said material to a pulverized state and gravitating the material down said conical shaped base, means for delivering air to said receptacle and agitating the air directly above said material for intermingling the pulverized material with the air, and means for withdrawing the pulverized material in suspension.

17. In a pulverizing machine a receptacle for receiving material in bulk, a multiplicity of screw conveyors disposed longitudinally of said receptacle and diametrically opposite each other for receiving material at the base of said receptacle and returning the material to a position adjacent the top thereof, a multiplicity of weights arranged to be fed in cyclic order by said screw conveyors for successively bombarding the bulk material from a plurality of predetermined positions for reducing said material to a pulverized state, means for independently or simultaneously driving said conveyors, and means for withdrawing the pulverized material.

18. In a pulverizing apparatus a receptacle for receiving material in bulk, a plurality of conveyors positioned longitudinally of said receptacle and connected at the base and upper portion thereof, a plurality of weights arranged to be moved in cyclic order by said conveyors for successively bombarding said bulk material from diametrically opposite positions in said receptacle for reducing said bulk material to a pulverized state, rotary driving means, means for independently connecting said rotary driving means with each of said conveyors for simultaneously or individually driving said conveyors, and means for withdrawing the pulverized material.

In testimony whereof I affix my signature.

WARREN C. S. GRAHAM.